United States Patent [19]

Maracic

[11] 4,116,585
[45] Sep. 26, 1978

[54] SELF-ADJUSTING WIND MACHINE

[76] Inventor: Mirko Maracic, 25-75 45th St., Astoria, N.Y. 11103

[21] Appl. No.: 738,618

[22] Filed: Nov. 3, 1976

[51] Int. Cl.² .............................................. F03D 7/04
[52] U.S. Cl. ..................................... 416/41; 416/135; 416/202
[58] Field of Search ................. 416/41, 42, 48, 136, 416/135, 132 B, 137, 138 R, 140 R, 202

[56] References Cited

U.S. PATENT DOCUMENTS

| 109,545 | 11/1870 | Randall | 416/138 |
|---|---|---|---|
| 183,740 | 10/1876 | Young | 416/136 |
| 187,435 | 2/1877 | Watson | 416/41 |
| 232,815 | 10/1880 | Gray | 416/138 |
| 351,537 | 10/1886 | Simpson | 416/202 X |
| 399,171 | 3/1889 | Townsend | 416/135 X |
| 484,826 | 10/1892 | Stauber | 416/137 |
| 690,950 | 1/1902 | Hau | 416/136 X |
| 726,376 | 4/1903 | Tompkins | 416/137 |
| 786,408 | 4/1905 | Burnett | 416/133 |
| 797,197 | 8/1905 | Gran | 416/137 |
| 1,403,069 | 1/1922 | Burne | 416/23 X |
| 1,633,842 | 6/1927 | Bishop | 416/DIG. 4 |
| 1,782,280 | 11/1930 | Willenbring | 416/154 |
| 2,054,383 | 9/1936 | Ludewig | 416/202 X |
| 2,115,486 | 4/1938 | Domenico | 416/137 |
| 2,974,731 | 3/1961 | Mader | 416/136 X |

FOREIGN PATENT DOCUMENTS

| 2,528 | 6/1932 | Australia | 416/50 |
|---|---|---|---|
| 97,571 | 7/1924 | Austria | 416/136 |
| 904,400 | 2/1954 | Fed. Rep. of Germany | 416/136 |
| 1,005,681 | 4/1957 | Fed. Rep. of Germany | 416/140 |

Primary Examiner—Everette A. Powell, Jr.
Attorney, Agent, or Firm—Daniel Jay Tick

[57] ABSTRACT

A plurality of blades are rotatably affixed to a rotatably mounted shaft and overlap each other in a plane perpendicular to the axis of the shaft in a strong wind force. In a weak wind force, the blades rotate to large angles with the axis of the shaft.

7 Claims, 10 Drawing Figures

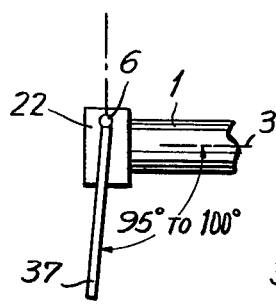
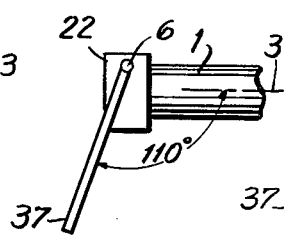
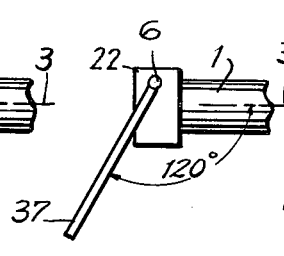
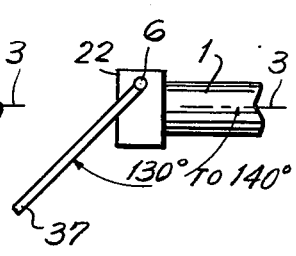
FIG.5a  FIG.5b  FIG.5c  FIG.5d
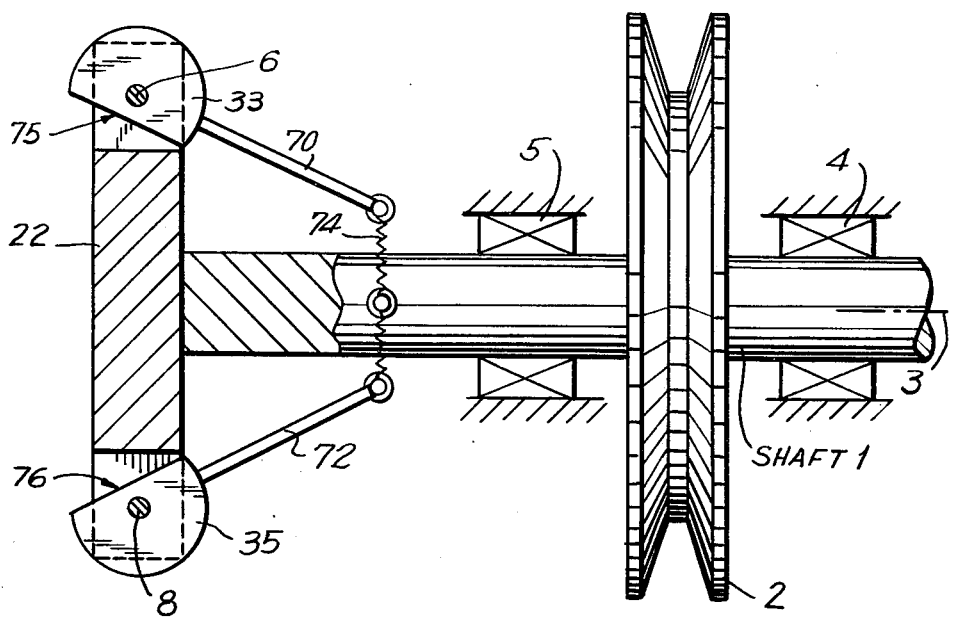
FIG.6
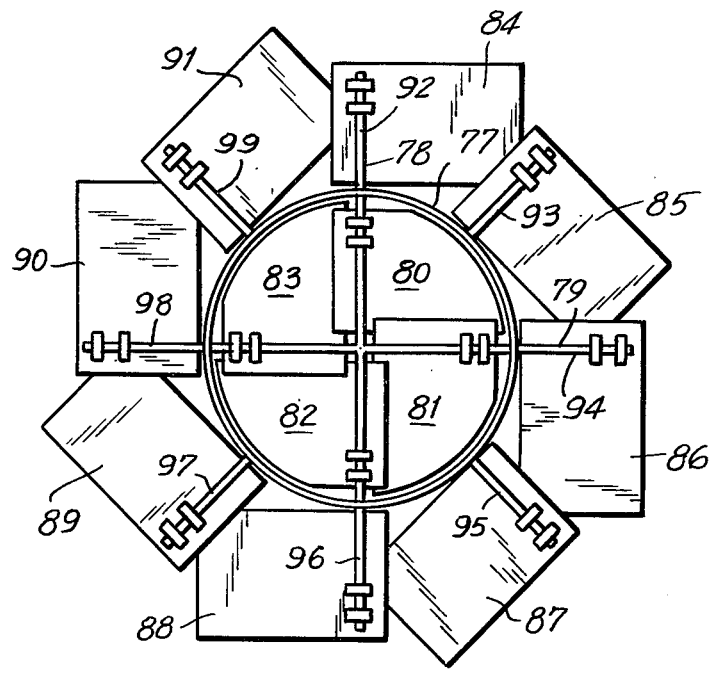
FIG.7

SELF-ADJUSTING WIND MACHINE

BACKGROUND OF THE INVENTION

The present invention relates to a self-adjusting wind machine. More particularly, the invention relates to a self-adjusting wind machine for harnessing the power of the wind.

Known types of wind machines for harnessing the power of the wind are inefficient in operation due to their use of blades which are fixed in position on a shaft and because the blades are spaced from each other in the manner of aircraft propellers. The spacing of the blades from each other in known machines results in a great loss of blade or sail surface and therefore creates a corresponding propulsive power loss. The inflexibility of the blades or sails results in a considerable reactive force or counterforce which dissipates energy to a great extent.

The principal object of the invention is to provide a self-adjusting wind harnessing machine.

An object of the invention is to provide self-adjusting wind machine which overcomes the disadvantages of known types of wind machines.

Another object of the invention is to provide a self-adjusting wind machine which operates efficiently, effectively and reliably.

Still another object of the invention is to provide a self-adjusting wind machine which is of simple structure and is inexpensive in manufacture.

Yet another object of the invention is to provide a self-adjusting wind machine which presents a minimum reactive force or counterforce to the wind.

Another object of the invention is to provide a self-adjusting wind machine which provides a maximum blade surface and a corresponding minimum propulsive power loss.

BRIEF SUMMARY OF THE INVENTION

In accordance with the invention, a self-adjusting wind machine for harnessing the power of the wind comprises a rotatably mounted shaft having output means coupled thereto and rotatable therewith for transferring rotary motion of the shaft. The shaft has an axis.

A mounting device rotatably mounts a plurality of blades on the shaft in a manner wherein the blades overlap each other to form a substantially planar disc-type surface when the wind force is strong thereby imparting a high number of revolutions per minute to the shaft and are rotated by the wind to large angles with the axis of the shaft when the wind force is weak thereby spacing the blades from each other and imparting a low number of revolutions per minute to said shaft.

A control device is coupled to the mounting means for controlling the ratio of revolutions per minute of the shaft relative to the force of the wind.

In accordance with the invention, a self-adjusting wind machine for harnessing the power of the wind comprises a rotatably mounted shaft having an output device coupled thereto and rotatable therewith for transferring rotary motion of the shaft. The shaft has an axis. A mounting device rotatably mounts a plurality of blades on the shaft in a manner wherein the blades overlap each other in a plane substantially perpendicular to the axis of the shaft when the wind force is strong and are rotated by the wind to large angles with the axis of the shaft when the wind force is weak. A control device is coupled to the mounting device for controlling the ease of rotation of the blades.

In accordance with the invention, the self-adjusting wind machine for harnessing the power of the wind comprises a rotatably mounted shaft having an output device coupled thereto and rotatable therewith for transferring rotary motion of the shaft. The shaft has an axis. Each of a plurality of support rods has spaced opposite first and second ends and an axis. A hub is affixed to the shaft and rotatable therewith. The hub has mounting devices for mounting the plurality of support rods in equidistantly spaced relation from the axis of the shaft in a plane perpendicular to the axis for free rotation about the axis of each of the rods. Each of the rods extends in the same direction of rotation of the shaft, tangential to a coaxial circle of the shaft. The rods are equiangularly spaced from each other. The hub further has securing devices for permitting a predetermined axial movement of each of the support rods and preventing each of the rods from leaving the hub. Each of a plurality of blades is affixed to a corresponding one of the support rods and is rotatable therewith. The blades convert a wind into rotation of the shaft. Each of the blades rotates with the support rod to which it is affixed in accordance with the force and direction of the wind in a manner whereby at a weak wind force each blade is at a large angle of approximately 130° to 140° with the axis of the shaft and overlaps the next-adjacent blades to a predetermined extent and at a strong wind force each blade is at a small angle of approximately 95° to 100° with the axis of the shaft and is spaced a minimum distance from the next-adjacent blades. A spring device is coupled to the support rods via the securing devices for adjusting the ease of rotation of the rods and thereby controlling the angles of the blades relative to the axis of the shaft.

The mounting device of the hub comprise a plurality of bores extending in the same direction of rotation of the shaft in a plane perpendicular to the axis of the shaft, tangential to a coaxial circle of the shaft, and equiangularly spaced from each other. Each of the support rods is rotatably and movably positioned in a corresponding one of the bores of the hub. The hub has a plurality of notches formed therein, each intersecting a corresponding one of the bores of the hub in a manner whereby part of each support rod positioned in its bore is exposed.

The securing devices of the hub comprise a plurality of collars each affixed to a corresponding one of the support rods in the notch intersecting the bore in which the support rod is positioned. Each of the collars is spaced a short distance from the edges of the notch thereby restricting axial movement of the corresponding rod to such short distances.

Each of the blades comprises a substantially rectangular plate having a first pair of spaced substantially parallel sides, a second pair of spaced substantially parallel sides substantially perpendicular to the first pair of sides and a pair of substantially rectangular surfaces. Each of the blades is affixed to the corresponding support rod in the area of one of the first pair of sides with the support rod extending substantially parallel to the one of the sides.

The spring device comprises a plurality of pins each affixed to a corresponding one of the collars and extending substantially radially therefrom substantially perpendicular to the corresponding support rod. Each of the collars has a substantially flat cylindrical configuration with a planar surface along a chord thereof thereby forming a cam-like element. A spring is affixed to each of the pins and extends therebetween.

Each of the blades overlaps one of the next-adjacent blades in part of the area of one of the second pair of sides at part of the area of the one of its first pair of sides and overlaps the other of the next-adjacent blades in part of the area of the one of the first pair of sides at part of the area of the one of its second pair of sides.

BRIEF DESCRIPTION OF THE DRAWINGS

In order that the invention may be readily carried into effect, it will now be described with reference to the accompanying drawings, wherein:

FIGS. 5a to 5d are schematic diagrams of a blade illustrating its rotation under the force of the wind;

FIG. 6 is a view, on an enlarged scale, partly cut away and partly in section, showing part of the embodiment of FIGS. 1 to 3 of the wind machine of the invention; and FIG. 7 is an axial view, on a reduced scale, of another embodiment of the self-adjusting wind machine of the invention.

DETAILED DESCRIPTION OF THE INVENTION

The wind machine of the invention harnesses the power of the wind and is self-adjusting so that it operates at high efficiency.

The wind machine of the invention comprises a rotatably mounted shaft 1 (FIG. 6) having an output device 2 coupled thereto and rotatable therewith for transferring rotary motion of said shaft (FIG. 6). The output device 2 may comprise any suitable coupling member such as, for example, a drive wheel, gear, or the like. The output device 2 is coupled to any suitable output or load unit such as, for example, an electric generator, a pump, or the like, via a coupling, belt, coupling gear, or the like. The load unit thus produces a useful work output such as electrical energy, pumping action, or the like, converted from the force of the wind.

The shaft 1 has an axis 3 and is suitably supported by bearings such as, for example, bearings 4 and 5, for rotation about said axis, as shown in FIG. 6.

Figure 1:
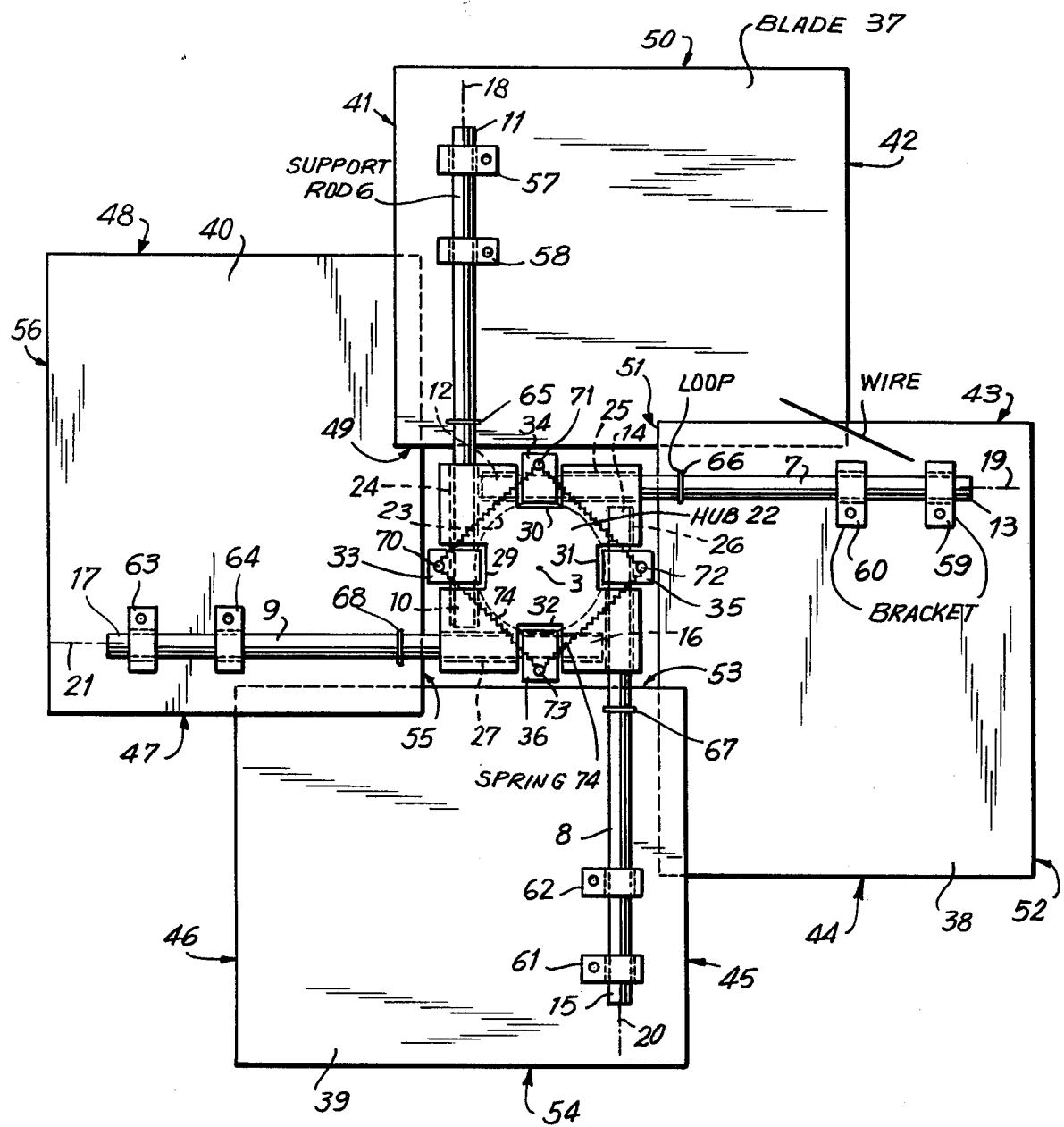
FIG. 1 is an axial view of an embodiment of the self-adjusting wind machine of the invention.

A plurality of support rods 6, 7, 8 and 9 are provided, as shown in FIG. 1. Each of the support rods 6, 7, 8 and 9 has spaced opposite first and second ends 10 and 11, 12 and 13, 14 and 15 and 16 and 17, respectively (FIG. 1). Each of the support rods 6, 7, 8 and 9 has an axis 18, 19, 20 and 21, respectively (FIG. 1).

A hub 22 (FIGS. 1 to 6) is coaxially affixed to the shaft 1 and rotatable therewith. The hub 22 has mounting devices for mounting the plurality of support rods 6, 7, 8 and 9 in equidistantly spaced relation from the axis 3 of the shaft 1 in a plane perpendicular to said axis for free rotation about the axis of each of said rods. The mounting devices mount the support rods 6 to 9 in a manner, shown in FIG. 1, whereby each of the rods extends in the same direction of the rotation of the shaft, tangential to a coaxial circle 23 of the shaft (FIG. 1). The mounting devices also mount the support rods 6 to 9 so that they are equiangularly spaced from each other, as shown in FIG. 1.

The mounting devices of the hub 22 comprise a plurality of bores 24, 25, 26 and 27 extending in the same direction of rotation of the shaft 1 in a plane 28 (FIG. 5a) perpendicular to the axis 3 of said shaft, tangential to the coaxial circle 23 of the shaft, and equiangularly spaced from each other, as shown in FIG. 1. In the embodiment of the invention illustrated in FIG. 1, the bores 24 to 27 are spaced 90° from each other.

The support rods 6, 7, 8 and 9 are rotatably and movably positioned in the bores 24, 25, 26 and 27, respectively, of the hub 22. The hub 22 has a plurality of notches 29, 30, 31 and 32 formed therein (FIG. 1). The notches 29, 30, 31 and 32 intersect the bores 24, 25, 26 and 27, respectively, of the hub 22 in a manner whereby part of each of the support rods 6, 7, 8 and 9, respectively, is exposed in the corresponding notch.

Figure 4:
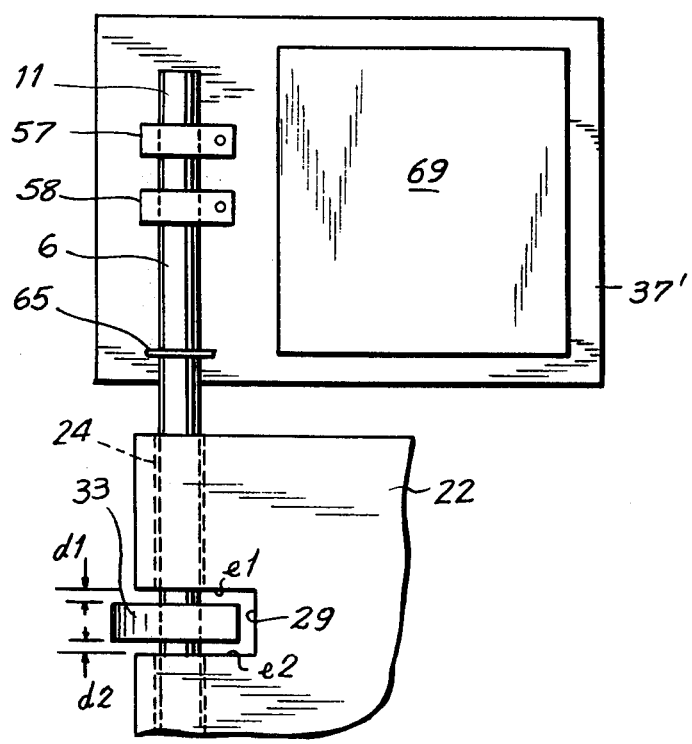
FIG. 4 is a view of another embodiment of a blade of the wind machine of the invention.

The hub 23 also has securing devices for permitting a predetermined axial movement of each of the support rods 6 to 9 and preventing each of said rods from leaving the hub. The securing devices of the hub 22 comprise a plurality of collars 33, 34, 35 and 36 affixed to the support rods 6, 7, 8 and 9, respectively, in the notches 29, 30, 31 and 32, respectively, intersecting the bores 24, 25, 26 and 27, respectively, in which said support rods are positioned, as shown in FIG. 1. Each of the collars 33, 34, 35 and 36 is spaced a short distance from the edges of the corresponding notch thereby restricting axial movement of the corresponding rod to such short distances. Thus, as shown in FIG. 4, the collar 33 is spaced a short distance d1 from the upper edge e1 of the notch 29 and is spaced a short distance d2 from the lower edge e2 of said notch. The axial movement of the support rod 6 is thus limited to an upward distance d1 or a downward distance d2.

A plurality of blades 37, 38, 39 and 40 are provided (FIG. 1). The blades, sails, sheets, or the like, 37, 38, 39 and 40 are affixed to the support rods 6, 7, 8 and 9, respectively (FIG. 1), and are rotatable with said support rods. The blades 37 to 40 convert a wind into rotation of the shaft 1. The blades 37 to 40 rotate with the support rods 6 to 9, respectively, to which they are affixed, in accordance with the force and direction of the wind.

The blades 37 to 40 rotate in a manner whereby at a strong wind force, depicted in FIGS. 1 and 5a, each blade is at a small angle of approximately 95° to 100° with the axis 3 of the shaft 1 and overlaps the next-adjacent blades to a predetermined extent. The blades 37 to 40 are thus substantially in a plane 28 substantially perpendicular to the axis of the shaft (FIG. 5a), in overlapping relation, when the wind force is strong. As a result, the blades 37 to 40 rotate the shaft 1 at a high number of RPMs in a strong wind.

At a weak wind force, depicted in FIG. 5d, each blade 37 to 40 is at a large angle of approximately 130° to 140° with the axis 3 of the shaft 1, and is spaced a maximum distance from the next-adjacent blades. As a result, the blades 37 and 40 rotate the shaft 1 at a lower number of RPMs in a weak wind. The wind thus rotates the blades 37 to 40 about the axes 18 to 21 of the support rods 6 to 9, respectively, as shown in FIGS. 5a to 5d, while causing said blades to rotate the shaft 1. FIG. 5b depicts a wind force weaker than the maximum, but strong in magnitude, and FIG. 5c depicts a wind force weaker than that depicted in FIG. 5b, but greater than the minimum. The rotation of the blades 37 to 40 about their support rods 6 to 9, respectively, by the wind, reduces the reactive force or counterforce and thereby greatly increases the efficiency of operation of the wind machine of the invention.

Each of the blades 37 to 40 comprises any suitable plate-like configuration, which together with the other blades provides a substantially planar disc-type or circular surface when the blades are at approximately 95° with the axis of the shaft 1. In the embodiment of FIG. 1, which is for a relatively small diameter unit, or a unit having a relatively small diameter when the blades 37 to 40 are spaced a minimum distance from each other, each of the blades 37 to 40 comprises a plate-like configuration, and preferably comprises a substantially rectangular plate having a first pair of spaced substantially parallel sides, a second pair of spaced substantially parallel sides substantially perpendicular to the first pair of sides, and a pair of substantially rectangular surfaces. Thus, as shown in FIG. 1, the blades 37, 38, 39 and 40 have a first pair of spaced substantially parallel sides 41 and 42, 43 and 44, 45 and 46, and 47 and 48, respectively. The blades 37, 38, 39 and 40 have a second pair of spaced substantially parallel sides 49 and 50, 51 and 52, 53 and 54, and 55 and 56, respectively, substantially perpendicular to the first pair of sides.

As shown in FIG. 1, the blades 37 to 40 are affixed to the support rods 6 to 9, respectively, in the area of the sides 41, 43, 45 and 47, respectively, of the first pair of sides of each blade, with the support rods extending substantially parallel to said sides. The blades 37 to 40 are affixed to the corresponding support rods 6 to 9, respectively, via a pair of spaced brackets, or the like, 57 and 58, 59 and 60, 61 and 62, and 63 and 64, respectively. The blades 37 to 40 are further secured to the corresponding support rods 6 to 9 via a loop 65, 66, 67 and 68, respectively, spaced from the brackets.

The blades 37, 38, 39 and 40 are affixed to the second ends 11, 13, 15 and 17 of the support rods 6, 7, 8 and 9, respectively, said ends being farthest from the axis 3 of the shaft 1. This enables the central force to be transferred to the farther ends 11, 13, 15 and 17 of the support rods to provide a lever effect. This results in a predetermined force becoming much greater when applied to the ends 11, 13, 15 and 17 of the support rods.

Although each of the blades 37 to 40 preferably comprises solid material, of uniform thickness, it may have a cutout area, such as, for example, the area 69, shown in FIG. 4, filled with a material of lighter weight than the remainder of the blade. The material of the blades 37 to 40 may comprise any suitable material of great strength which does not transmit wind therethrough.

In the embodiment of FIG. 1, the blade 37 overlaps the blade 40 in part of the area of the side 55 of the blade 40 at part of the area of the side 41 of the blade 40 and overlaps the blade 38 in part of the area of the side 43 of the blade 38 at part of the area of the side 49 of the blade 37, as shown in FIG. 1, when the wind force is strong or a maximum. The blade 38 overlaps the blades 37 and 39 in the same manner. The blade 39 overlaps the blades 38 and 40 in the same manner. The blade 40 overlaps the blades 39 and 37 in the same manner.

At the start of rotation, the blades are at their maximum angle with the axis 3 of the shaft 1. The blades move toward their minimum spacing from each other and their minimum angle with the axis of the shaft, as the shaft accelerates.

A spring device is coupled to the support rods 6, 7, 8 and 9 via the securing devices 33, 34, 35 and 36, respectively, and thereby controls the angles of the blades 37, 38, 39 and 40 relative to the axis 3 of the shaft 1 thereby controlling the reactive force or counterforce of the blades to the wind. The spring device controls the ratio of revolutions per minute of the shaft 1 relative to the force of the wind. The spring force is applied to keep the blades at their greatest spacing from each other and at the largest angle with the axis 3 of the shaft 1. The spring force thus tends to maintain a small number of RPMs and to position the blades in the most economical manner between wind force and rotational counterforce. The spring device comprises a plurality of pins 70, 71, 72 and 73 (FIG. 1) affixed to the collars 33, 34, 35 and 36, respectively, and extending substantially radially from said collars, substantially perpendicularly to the corresponding support rod. A spring 74 (FIGS. 1, 3 and 6) is affixed to each of the pins 70, 71, 72, 73 and extends therebetween. Thus, by adjusting the tension of the spring, a user adjusts the reactive forces of the support rods 6 to 9 to rotation, and thereby controls the counterforce of the blades 37 to 40, to control and enhance, considerably, the efficiency of operation.

Figure 2:
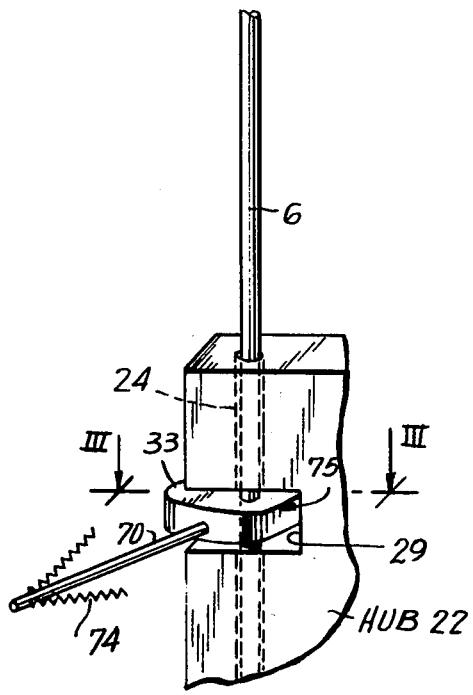
FIG. 2 is a perspective view, on an enlarged scale, of an embodiment of a securing device of the wind machine of the invention.
Figure 3:
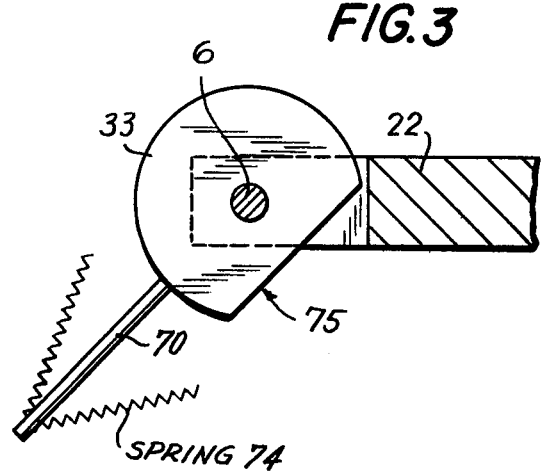
FIG. 3 is a view, on an enlarged scale, taken along the lines III—III, of FIG. 2.

As shown in FIGS. 2, 3 and 6, each of the collars 33, 34, 35 and 36 has a substantially flat cylindrical configuration with a planar surface along a chord thereof, thereby forming a cam-like element. Thus, the collar 33 has a planar surface 75, as shown in FIGS. 3 and 6, and the collar 35 has a planar surface 76, as shown in FIG. 6.

The blades 37 to 40 are preferably coupled loosely to each other via reinforcing wires, which prevent them from rotating to too small an angle with the axis 3 of the shaft 1.

The embodiment of FIG. 7 is for a relatively large diameter unit, or a unit having a relatively large diameter, such as, for example, 10 meters, when the blades are spaced a minimum distance from each other. There are two sets of blades, mounted on a frame having a circular post 77 and cross pieces 78 and 79. The blades are of any suitable plate-like configuration, which together with the other blades provides a substantially planar disc-type or circular surface when the blades are positioned in a strong wind and impart high RPMs to the shaft.

In the embodiment of FIG. 7, each of the blades is mounted on a support rod in the same manner as in the embodiment of FIG. 1 and the blades rotate in accordance with the force of the wind, in the same manner as in the embodiment of FIG. 1, to produce rotation of the shaft, in the same manner as in the embodiment of FIG. 1. In the embodiment of FIG. 7, the first set of blades comprises blades 80, 81, 82 and 83 mounted in a similar manner to the blades of the embodiment of FIG. 1. The second set of blades comprises blades 84, 85, 86, 87, 88, 89, 90 and 91 mounted on radially extending support rods 92, 93, 94, 95, 96, 97, 98 and 99, respectively, affixed to the circular part 77 of the frame.

While the invention has been described by means of specific examples and in specific embodiments, I do not wish to be limited thereto, for obvious modifications will occur to those skilled in the art without departing from the spirit and scope of the invention.

I claim:

1. A self-adjusting wind machine for harnessing the power of the wind, said wind machine comprising
   a rotatably mounted shaft having output means coupled thereto and rotatable therewith for transferring rotary motion of the shaft, the shaft having an axis;

a plurality of support rods each having spaced opposite first and second ends and an axis;

a hub affixed to the shaft and rotatable therewith, said hub having mounting means for mounting the plurality of support rods in equidistantly spaced relation from the axis of the shaft in a plane perpendicular to said axis for free rotation about the axis of each of said rods, each of said rods extending in the same direction of rotation of the shaft, tangential to a coaxial circle of the shaft, and said rods being equiangularly spaced from each other, said hub further having securing means for permitting a predetermined axial movement of each of the support rods and preventing each of said rods from leaving the hub;

a plurality of substantially rectangular blades, each having a side and being affixed to a corresponding one of the support rods in the area of said side and rotatable with the corresponding support rod, said blades converting a wind into rotation of said shaft, each of said blades rotating with the support rod to which it is affixed in accordance with the force and direction of the wind in a manner whereby at a weak wind force in directions substantially parallel to the shaft and striking a predetermined surface of each blade, each blade is at a large angle of approximately 130° to 140° with the axis of the shaft at the surface of the blade opposite the predetermined surface and overlaps the next-adjacent blades to a predetermined extent and at a strong wind force in directions substantially parallel to the shaft and striking a predetermined surface of each blade, each blade is at a small angle of approximately 95° to 100° with the axis of the shaft at the surface of the blade opposite the predetermined surface and is spaced a minimum distance from the next-adjacent blades; and spring means coupled to the support rods via the securing means for adjusting the ease of rotation of said rods and thereby controlling the angles of the blades relative to the axis of the shaft to control the rotary speed of the shaft, said spring means comprising a plurality of pins each affixed to a corresponding one of the securing means and extending substantially radially therefrom substantially perpendicularly to the corresponding support rod, and a spring affixed to each of the pins and extending therebetween.

2. A self-adjusting wind machine as claimed in claim 1, wherein the mounting means of the hub comprise a plurality of bores extending in the same direction of rotation of the shaft in a plane perpendicular to the axis of the shaft, tangential to a coaxial circle of the shaft, and equiangularly spaced from each other, each of the support rods being rotatably and movably positioned in a corresponding one of the bores of the hub, said hub having a plurality of notches formed therein each intersecting a corresponding one of the bores of the hub in a manner whereby part of each support rod positioned in its bore is exposed.

3. A self-adjusting wind machine is claimed in claim 1, wherein the securing means of the hub comprise a plurality of collars each affixed to a corresponding one of the support rods in the notch intersecting the bore in which the support rod is positioned and each of said collars being spaced a short distance from the edges of the corresponding notch thereby restricting axial movement of the corresponding rod to such short distances.

4. A self-adjusting wind machine as claimed in claim 1, wherein each of the blades comprises a substantially rectangular plate having a first pair of spaced substantially parallel sides, a second pair of spaced substantially parallel sides substantially perpendicular to the first pair of sides and a pair of substantially rectangular surfaces, and wherein each of the blades is affixed to the corresponding support rod in the area of one of the first pair of sides with the support rod extending substantially parallel to said one of said sides.

5. A self-adjusting wind machine as claimed in claim 1, wherein each of the blades is affixed to the second end of the corresponding one of the support rods.

6. A self-adjusting wind machine as claimed in claim 3, wherein the spring means comprises a plurality of pins each affixed to a corresponding one of the collars and extending substantially radially therefrom substantially perpendicularly to the corresponding support rod, each of said collars having a substantially flat cylindrical configuration with a planar surface along a chord thereof thereby forming a cam-like element, and a spring affixed to each of the pins and extending therebetween.

7. A self-adjusting wind machine as claimed as claim 4, wherein each of the blades overlaps one of the next-adjacent blades in part of the area of one of the second pair of sides at part of the area of said one of its first pair of sides and overlaps the other of the next-adjacent blades in part of the area of said one of the first pair of sides at part of the area of said one of its second pair of sides.

* * * * *